H. L. PIERCE.
Spinning-Ring.
No. 216,345. Patented June 10, 1879.
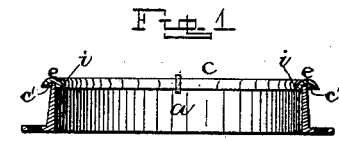
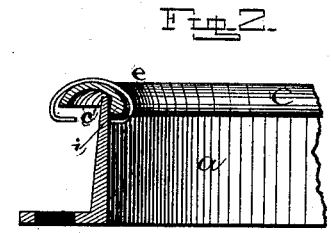
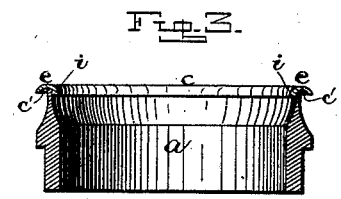
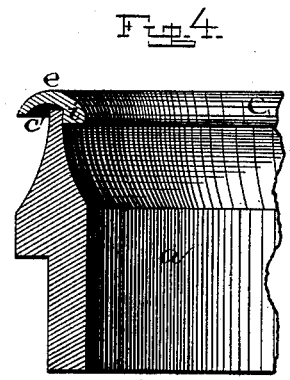
Witnesses:
Inventor:
H. L. Pierce,
per
J. A. Lehmann,
Att'y

UNITED STATES PATENT OFFICE.

HORATIO L. PIERCE, OF PROVIDENCE, RHODE ISLAND.

IMPROVEMENT IN SPINNING-RINGS.

Specification forming part of Letters Patent No. 216,345, dated June 10, 1879; application filed November 21, 1878.

*To all whom it may concern:*

Be it known that I, HORATIO L. PIERCE, of Providence, in the county of Providence and State of Rhode Island, have invented certain new and useful Improvements in Spinning-Rings; and I do hereby declare the following to be a full, clear, and exact description of the invention, such as will enable others skilled in the art to which it pertains to make and use it, reference being had to the accompanying drawings, which form part of this specification.

My invention relates to an improvement in spinning-rings; and it consists, first, in making the inner edge of the race of the ring thicker than at the other point, whereby not only is a greater wearing-surface made, but the traveler is not cut as much as where the edge is formed in the usual manner and the traveler is not so liable to "load" at its horn or bend on its inner end; second, in making the under side of the outer portion of the race of the ring recessed, which, in connection with the thick inner edge of the race, causes the traveler to run in an upright position, thereby lightening the draft and preventing the outer end of the traveler from cutting into the side of the ring; all of which will be more fully described hereinafter.

The accompanying drawings illustrate my invention, in which—

Figures 1, 2, 3, and 4 are vertical sections of two different forms of rings.

$a$ represents a common spinning-ring, which is either made separate from the race $c$ in the first instance, or, after the ring has become worn, the race is cut evenly off and then replaced by a new removable race.

Where the ring $a$ and race $c$ are made separate in the first instance the ring may be made of cheaper and softer metal, while the race may be of steel or highly-tempered iron.

By thus having the race readily removable from the ring different-sized races may be applied to the same ring, and when a race has become worn it can be at once removed and replaced by another without losing any time.

The race is made convex or rounded on its upper surface, $e$, and made thicker at its inner edge than at any other point. By making the race convex on its upper surface there is much less space left between it and the traveler, thereby not only decreasing the amount of vibration in the traveler while in motion, but leaving less space to be loaded by the fine particles of flying cotton that constantly fill the air.

By making the inner edge, $i$, of the race thicker than at any other part a much greater wearing-surface is made, thereby preventing the ring from being so soon worn out. As the race is made thickest at this point, its edge is made blunt and rounding, as shown, thereby preventing the traveler from being so soon cut through or worn at its horn, and decreasing the space in which the fiber would catch were the race made in the usual manner. This additional thickness at this point also forms a shoulder to catch over the base and causes the inner end of the traveler to be thrown downward sufficiently to make it travel in an upright position, thus decreasing not only the wear on both race and traveler, but causing the traveler to move with less friction.

The under side of the outer edge of the race $c$ is recessed, as shown, thereby enabling the outer horn of the traveler to be passed up into the recess $c'$, whereby a traveler having a smaller opening in it can be placed upon the same sized race; and the smaller this opening the less the liability of the traveler to fly off when in rapid motion.

As the travelers are all given a spring-temper, a very large number of them are broken in placing them upon the ordinary races; but this loss is almost entirely done away with by the recess $c'$ in the under side of the race, as the travelers do not have to be stretched to the straining point.

Having thus described my invention, I claim—

1. A spinning-ring having a race that is provided with the recess $c'$ in its inner side, to enable the traveler to be more easily placed in position, substantially as shown.

2. A spinning-ring having a race, $c$, which is provided with a thickened inner edge, $i$, and a recess, $c'$, in its inner side, substantially as described.

3. A spinning-ring having a race which is made round on top, provided with a thickened inner edge, $i$, and a recess, $c'$, in its under side, substantially as set forth.

In testimony that I claim the foregoing I have hereunto set my hand and seal this 12th day of November, A. D. 1878.

HORATIO L. PIERCE. [L. S.]

Witnesses:
 STEPHEN W. NICKETTOE,
 STEPHEN A. COOKE, Jr.